UNITED STATES PATENT OFFICE.

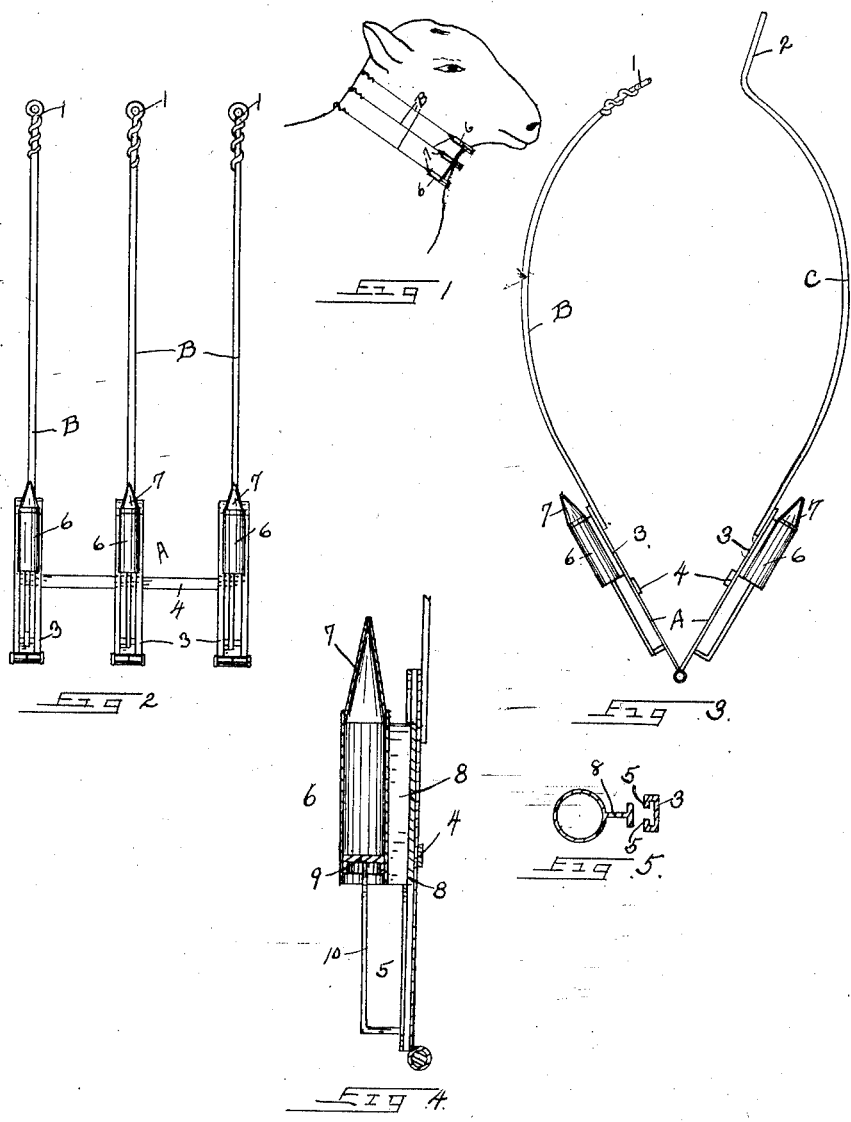

JOSEPH DUNCOMBE, OF SALT LAKE CITY, UTAH.

SHEEP-PROTECTOR AND COYOTE-EXTERMINATOR.

1,349,665. Specification of Letters Patent. Patented Aug. 17, 1920.

Application filed February 19, 1920. Serial No. 359,919.

*To all whom it may concern:*

Be it known that I, JOSEPH DUNCOMBE, a citizen of the United States, residing at Salt Lake City, in the county of Salt Lake and State of Utah, have invented certain new and useful Improvements in Sheep-Protectors and Coyote-Exterminators, of which the following is a specification.

My invention relates to sheep protection, and has for its object to provide a device which is to be fastened on the neck of sheep to protect them from dogs and wolves. A further object is to provide means of carrying poison as a portion of said device whereby the dog or wolf in attempting to kill the sheep protected with one of my devices will inoculate the dog or wolf with the poison sufficient to cause its death.

These objects I accomplish with the device illustrated in the accompanying drawings in which similar letters and numerals of reference indicate like parts throughout the several figures and as described in the specification forming a part of this application and pointed out in the appended claim.

In the drawings in which I have shown a substantial embodiment of my invention Figure 1 is a side view of the head and neck of a sheep with my device in place thereon. Fig. 2 is a side elevation of the device removed from the sheep. Fig. 3 is an edge elevation of the device before it is fastened on the sheep. Fig. 4 is a longitudinal section through the poison carrying syringe and the syringe guide and contiguous portions of the device. Fig. 5 is a transverse section of one of the syringes and guide-way therefor.

It is known that most dogs which kill sheep and all wolves such as coyotes kill them by catching the sheep at the throat, and either sever the jugular vein or choke the sheep to death by gripping the throat. The present invention is intended to protect the throat of a sheep by providing an inexpensive wire guard to be secured around the neck of the sheep, and having barbs thereon to snag or otherwise injure the killing animal, and the sheep protector is further improved by providing a plurality of poison carrying syringes so constructed that the nozzle of each syringe will act as a barb to injure the mouth or lips of the dog or wolf and infect the sheep killing animal with a poison to cause its death.

The invention consists of a hingedly connected light frame A, which frame is fastened on the neck of a sheep by wire collars each comprising short pieces of wire B and C which are secured at their lower ends to said frame and in each of the wires B an eye loop 1 is formed, while the end portions 2 of said wires C are to be passed through the respective eye loops 1 and fastened by twisting the said end portion around the main body of the wire. Preferably I provide three of said wire collars as shown in Fig. 2. The hinged connection of the sides of said frame A make it easy to adjust and fasten the device on the neck of the sheep. The sides of said frame are duplicates so I will describe but one side, which consists of syringe guide plates 3 formed into a hinge at one end, and held in spaced apart relation to each other by the transverse cross piece 4. Each of said guide plates 3 consists of a flat thin strip of metal having its edges turned inwardly as at 5. Each of the syringes consists of a chamber 6 having a pointed end or nozzle 7. On the outer wall of said chamber 6 is secured a longitudinally disposed guide brace 8, which is T-shaped in cross section, as shown in Fig. 5, and is to be operated within said guide plate 3. A piston 9 is operated within said chamber 6 by having its connecting rod or plunger 10 secured at one end to said guide plate 3. I thus provide a plurality of poison carrying syringes, each independently operable by pressing down on the nozzle 7 whereby the poison carried in the chambers 6 will be discharged through the nozzle, and with the nozzles sharpened to form barbs for injuring the attacking animal, and with the device easily and quickly secured as a collar on the sheep with the said frames and syringes worn at the throat of the sheep to provide protection for the sheep and to exterminate the attacking animal.

Having thus described my invention I desire to secure by Letters Patent and claim:

A sheep protector and animal exterminator comprising a collar to be worn on the neck of the sheep; having a plurality of poison carrying syringes secured thereto and adapted to be worn at the throat of the sheep, each of said syringes having a sharpened nozzle, and adapted to discharge said poison by pushing downwardly on the nozzles.

In testimony whereof I have affixed my signature.

JOSEPH DUNCOMBE.